US011411943B2

(12) United States Patent
Mallinson et al.

(10) Patent No.: US 11,411,943 B2
(45) Date of Patent: Aug. 9, 2022

(54) SINGLE SIGN-ON USING SMART CREDENTIAL

(71) Applicant: Entrust, Inc., Dallas, TX (US)

(72) Inventors: Michael Mallinson, Carlton Place (CA); Ian Reilly, Ottawa (CA); Rathnavalli Jayaprakash, Nepean (CA); Martin Dale Lyness, Savage, MN (US); Tim Gerlach, Castle Rock, CO (US)

(73) Assignee: Entrust Corporation, Shakopee, MN (US)

( * ) Notice: Subject to any disclaimer, the term of this patent is extended or adjusted under 35 U.S.C. 154(b) by 91 days.

(21) Appl. No.: 16/705,442

(22) Filed: Dec. 6, 2019

(65) Prior Publication Data

US 2020/0195630 A1 Jun. 18, 2020

Related U.S. Application Data

(60) Provisional application No. 62/776,337, filed on Dec. 6, 2018.

(51) Int. Cl.
*H04L 29/06* (2006.01)
*H04L 9/40* (2022.01)
(Continued)

(52) U.S. Cl.
CPC ........ *H04L 63/0815* (2013.01); *H04L 9/3263* (2013.01); *H04L 9/3271* (2013.01);
(Continued)

(58) Field of Classification Search
None
See application file for complete search history.

(56) References Cited

U.S. PATENT DOCUMENTS 6,886,095 B1   4/2005  Hind et al.
8,719,952 B1 * 5/2014  Damm-Goossens ..................... H04L 9/0897
                                                                 726/28
(Continued)

FOREIGN PATENT DOCUMENTS

EP      2 200 251 A1    6/2010
EP      1601153 B1 *    7/2010   ......... H04L 63/0869
KR   10-2016-0028230 A  3/2016

OTHER PUBLICATIONS

International Search Report and Written Opinion for Application No. PCT/US2019/064892 dated Mar. 26, 2020.

*Primary Examiner* — Jeffrey C Pwu
*Assistant Examiner* — Mayasa A. Shaawat
(74) *Attorney, Agent, or Firm* — Merchant & Gould P.C.

(57) ABSTRACT

Methods and systems for facilitating authentication of a user with a plurality of applications are described. One method includes authenticating a user with a first secure application based on information received from a smart credential stored on a mobile device via a local wireless connection. The method includes obtaining a remote challenge from a remote authentication service and a mobile challenge, signing the mobile challenge with a private key, and transmitting a signed version of the mobile challenge, the remote challenge, and a public key to the mobile device. The method further includes receiving a signed version of the remote challenge and a certificate indicating validation of the mobile challenge, and transmitting the signed version of the remote challenge to the remote authentication service. Based on receiving an authentication result from the remote authentication service, access is granted to a remote secure application via the browser.

21 Claims, 6 Drawing Sheets

(51) Int. Cl.
*H04L 9/32* (2006.01)
*H04W 12/06* (2021.01)
*H04W 4/80* (2018.01)

(52) U.S. Cl.
CPC ...... *H04L 63/0823* (2013.01); *H04L 63/0853* (2013.01); *H04W 12/068* (2021.01); *H04W 4/80* (2018.02)

(56) References Cited

U.S. PATENT DOCUMENTS

| | | |
|---|---|---|
| 9,092,969 B2 * | 7/2015 | McCown ............... H04M 11/04 |
| 2003/0007641 A1 | 1/2003 | Kinoshita |
| 2016/0189151 A1 * | 6/2016 | He ....................... H04L 9/3215 |
| | | 705/75 |
| 2017/0324568 A1 * | 11/2017 | Roth ................... H04L 63/0884 |
| 2018/0183777 A1 * | 6/2018 | Guillory ............... H04L 9/3271 |
| 2020/0084284 A1 * | 3/2020 | Chauhan .................. H04L 67/02 |
| 2020/0162447 A1 * | 5/2020 | Fletcher .................. H04L 67/10 |

\* cited by examiner

SINGLE SIGN-ON USING SMART CREDENTIAL

CROSS-REFERENCE TO RELATED APPLICATIONS

The present application claims priority from U.S. Provisional Patent Application No. 62/776,337, filed on Dec. 6, 2018, the disclosure of which is hereby incorporated by reference in its entirety.

BACKGROUND

Applications configured to run natively on local computing devices (e.g., desktop or laptop computing devices, kiosk-type or terminal-type devices, etc., typically operating within a desktop computing environment) may require a high level of security, sometimes beyond simple username and password authentication. For example, such applications may require multifactor authentication, with a username/password authentication and an additional form of authentication (e.g., PIN or other code) or smart card or smart credential based authentication. For such systems, a mobile device may have a virtual smart card installed thereon, which facilitates authentication of the user for use of the local computing system.

In some instances, a user of such a local computing device may wish to use a browser application on that device to access remote applications (e.g., hosted by a remote server or offered on a software-as-a-service basis). However, that remote software may also be secure software requiring user authentication. Even in circumstances in which the remote software uses authentication credentials that are the same as those used for the application at the local computing system the remote software may require the user to re-authenticate him/herself within a browser window prior to accessing that software. This may also be the case where different authentication credentials are used for local and remote software, but both are managed using a similar credentialing process or credentialing mechanism, such as a smart card or other smart credential. This can be the case where an enterprise uses both local and remote or cloud applications. As such, there are a variety of instances in which separate authentication processes are required for both local and remote secure applications for the same user, and even in the same use session, causing significant inconvenience to that user.

SUMMARY

The present disclosure relates generally to facilitating sign-on to a plurality of secure applications with improved convenience. In general, the present disclosure provides for a single sign-on mechanism that allows a user who has been required to use a secure credential to access a first computing system, such as a local computing system, to subsequently access other computing resources (e.g., remote secure applications, such as cloud-based or server-based applications) that also require secure credential-based authentication. The subsequent authentication of the user based on that secure credential for subsequent access of other computing resources can be accomplished largely without requiring user involvement, due to coordination between a local computing system, a mobile device, and a remote authentication service.

In a first aspect, a method includes authenticating, at a first computing system, a user with a first secure application based on information received from a smart credential stored on a mobile device via a local wireless connection between the mobile device and the first computing system. The method further includes obtaining, via a browser of the first computing system, a remote challenge from a remote authentication service, and obtaining, via a browser of the first computing system, a mobile challenge from the mobile device. The method includes signing the mobile challenge with a private key of a public-private key pair at the first computing system, transmitting to the mobile device a version of the mobile challenge signed at the first computing system, the remote challenge, and a public key of the public-private key pair, and receiving, from the mobile device, a signed version of the remote challenge and a certificate indicating validation of the mobile challenge. The method further includes transmitting the signed version of the remote challenge to the remote authentication service, and, based on receiving an authentication result from the remote authentication service, granting access at the first computing system to a remote secure application via the browser.

In a second aspect, a method of authenticating a user for use of a plurality of secure applications includes establishing a local wireless connection between a mobile device and a first computing system. The method also includes, in response to receipt of a request from the first computing system, transmitting a mobile device challenge to the first computing system, and receiving a signed version of the mobile device challenge, a remote authentication challenge, and a public key of a public-private key pair from the first computing system, the signed version of the mobile device challenge being signed with a private key of the public-private key pair. The method further includes validating the signed version of the mobile device challenge using the public key, and signing the remote authentication challenge with the user credentials stored at the mobile device. The method includes transmitting a signed version of the remote authentication challenge and a certificate to the first computing system In a third aspect, a system for facilitating authentication of a user with a plurality of secure applications is disclosed. The system includes a computing system. The computing system includes a local wireless communication interface, a network interface, a programmable circuit operatively connected to the local wireless communication interface and the network interface, and a memory operatively connected to the programmable circuit. The memory stores instructions comprising a first secure application, a browser and a local wireless communication driver. The instructions are further configured to, when executed by the programmable circuit: authenticate, at a first computing system, a user with a first secure application based on information received from a mobile device via a local wireless connection between the mobile device and the first computing system; obtain a remote challenge from a remote authentication service; obtain, via the browser, a mobile challenge from the mobile device; sign the mobile challenge with a private key of a public-private key pair; transmit to the mobile device a signed version of the mobile challenge, the remote challenge, and a public key of the public-private key pair; receive, from the mobile device, a signed version of the remote challenge and a certificate indicating validation of the mobile challenge; transmit the signed version of the remote challenge to the remote authentication service; and based on receiving an authentication result from the remote authentication service, grant access to a remote secure application via the browser.

A variety of additional aspects will be set forth in the description that follows. The aspects can relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

DETAILED DESCRIPTION

Figure 1:
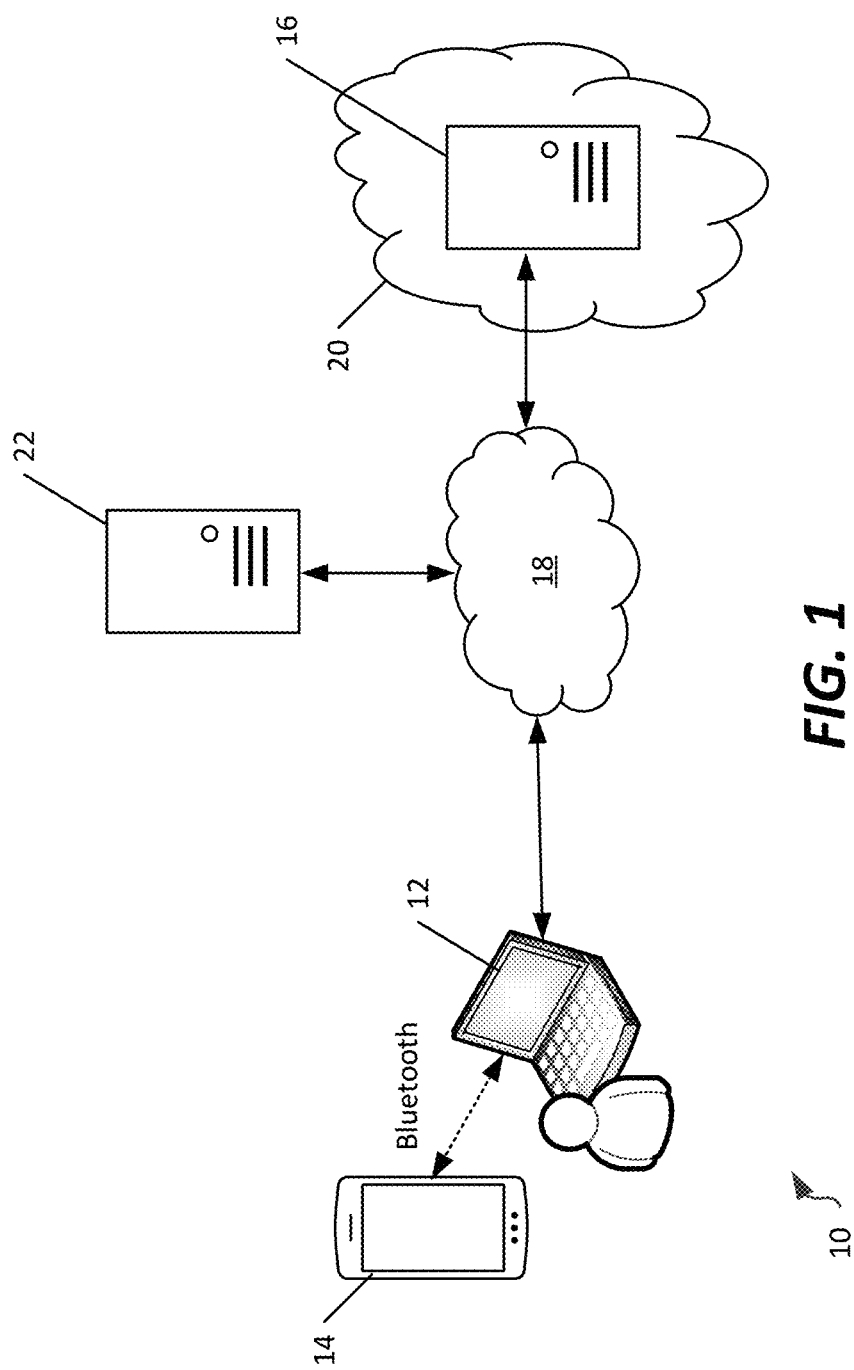
FIG. 1 illustrates an example network within which aspects of the present disclosure can be implemented.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

As briefly described above, embodiments of the present invention are directed to methods and systems for signing on to secure applications in an efficient manner, e.g., by performing a single sign-on process that can be reused across different secure applications. In general, the present disclosure provides for a single sign-on mechanism that allows a user who has been required to use a secure credential to access a first computing system, such as a local computing system, to subsequently access other computing resources (e.g., remote secure applications, such as cloud-based or server-based applications) that also require secure credential-based authentication. The subsequent authentication of the user based on that secure credential for subsequent access of other computing resources can be accomplished largely without requiring user involvement. In some instances, the single sign-on mechanisms can be entirely or partially obscured from the user, to provide an appearance of seamless access of applications. Additionally, the methods and systems described herein can leverage a convenient secure authentication mechanism, such as a virtual smart card technology in which a mobile device stores a virtual smart card that is useable for local authentication of the user at a computing system via a short-range wireless (e.g., Bluetooth) connection.

Referring to FIG. 1, an example network 10 within which aspects of the present disclosure can be implemented is illustrated. In the example network 10 shown, a first computing system 12 is operated by a user. The first computing system 12 can be, for example, a desktop or laptop computing system or a tablet or other mobile device that is directly operated by a user. The first computing system 12 has one or more applications installed thereon, including, for example, the operating system of the system, as well as user applications executed within the environment of the operating system. In use, the user seeks access to one or more applications. Such applications can include, e.g., the operating system of the computing device 12, a local application executing at the first computing system 12, or applications stored remotely from the first computing system 12. In example instances, the applications themselves, or the operating system, may require the user to be authenticated to allow access to the applications. Accordingly, in the context of the present disclosure any of a local operating system, local applications, and remote applications which each may apply security policies or only permit access based on user authentication can be referred to as a secure application.

In the embodiment shown, the first computing system 12 is communicatively connected to a mobile device 14 via a short-range wireless network. The short range wireless network can be any of a variety of such short-range networks, one example of which is Bluetooth, which may include both traditional Bluetooth and Bluetooth Low Energy (BLE) variants. Other short range wireless communication protocols, such as Near Field Communication (NFC) could be used in alternative embodiments. Alternatively, the mobile device 14 can be connected to the first computing system by an alternative connection, e.g., by way of an ad-hoc WiFi network, or by a wired connection. The mobile device 14 can be implemented to host a smart credential, such as the Mobile Smart Credential provided by Entrust Datacard of Shakopee, Minn.

The first computing system 12 is also connected to a remote computing system 16 via a network 18, such as the internet. The remote computing system 16 may be, as shown in FIG. 1, a cloud server. Alternatively, the remote computing system may be a remote enterprise server or other remote computing system that is communicatively connected to the first computing system 12 via any type of network, including the Internet, as well as various other LAN, WAN or other networks.

In the example shown, the remote computing system 16 hosts one or more secure applications that can be accessible from the first computing system 12. In example instances, the one or more secure applications resident on the remote computing system 16 can be accessible at the first computing system 12 via a browser application.

In the example shown, a remote authentication service 22 is also communicatively accessible from the first computing system 12. The remote authentication service 22 is generally accessible from the first computing system 12, and may be redirected by remote computing system 16 to provide authorization to access the one or more secure applications hosted thereon. In an example embodiment, the remote authentication service can be implemented using a secure remote authentication service refererred to as the INTELLITRUST portal provided by Entrust Datacard of Shakopee, Minn.

Figure 2:
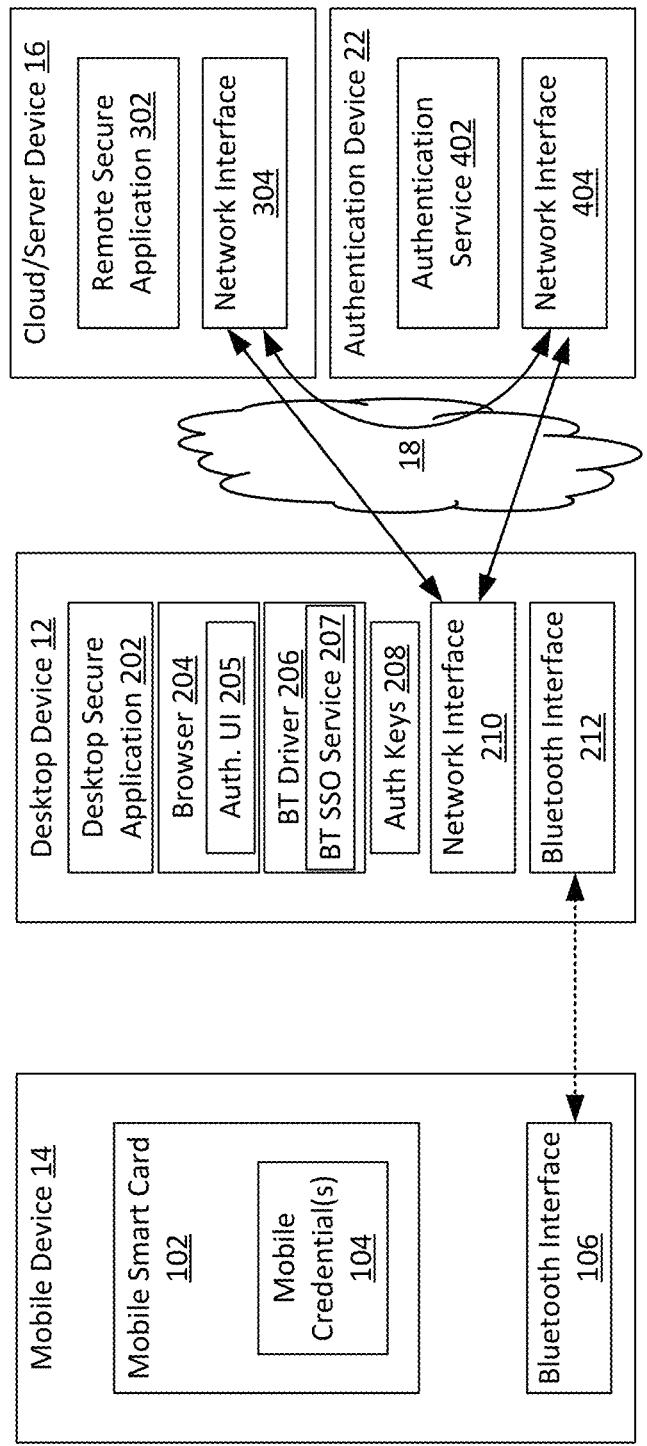
FIG. 2 illustrates a detailed embodiment of a system within which single sign-on using a smart credential can be performed.

FIG. 2 illustrates a detailed embodiment of a system 100 within which single sign-on using a smart credential can be performed. The system 100 is implemented with particular implementations of the computing systems of FIG. 1, including, e.g., mobile device 14, first computing device 12 (shown as a desktop computing device), a remote computing system 16 (shown as a cloud or server device), and a remote authentication service 22.

In the embodiment shown, the mobile device 14 stores a mobile smart card 102 that has mobile credentials 104 embodied therein. The mobile credentials 104 can include, for example, unique information associated with a user, or instructions that can generate unique user information in response to a user logging in to an application on the mobile device 12 that enables the mobile smart card 102. In example embodiments, the mobile smart card 102 can be implemented using a Mobile Smart Credential provided by Entrust Datacard of Shakopee, Minn.

In the example shown, the mobile device 14 also has a short range wireless interface, shown as Bluetooth interface 106. Other short range wireless interfaces are available as well (e.g., an ad-hoc WiFi communication connection between two devices). In general the short range wireless interface can be an interface which is configured to either automatically or manually connect to a local device (such as desktop device 12) when within wireless communication range of that device.

In the example shown, the desktop device 12 includes a desktop secure application 202, a browser 204, a Bluetooth driver 206, authentication keys 208, a network interface 210, and a Bluetooth interface 212. The desktop secure application 202 generally corresponds to an application that requires authentication for access that is executable on the desktop device 12. For example the desktop secure application 202 could include an operating system, a local application requiring authentication, or a hosted application at the desktop device 12 that also requires authentication. The browser 204 includes in the example shown an authentication user interface 205. The authentication user interface 205 may be code that executes within the browser 204, such as Javascript or other code capable of executing a process for authenticating a user remotely. The authentication user interface can be displayed within the browser 204 upon the browser being redirected to an authentication system such as authentication device 22. The authentication user interface 205 can be used to remotely authenticate a user in association with use of either the desktop secure application 202 or a remote secure application, such as remote secure application 302 on server device 16.

In the example shown the Bluetooth interface 212 allows for a local wireless connection to a corresponding Bluetooth interface 106 of mobile device 14. In operation, Bluetooth interface 212 or Bluetooth interface 106 will scan a local wireless area and recognize the corresponding Bluetooth interface. Accordingly when the mobile device 14 is in proximity to desktop device 12, the mobile device 14 and the desktop device 12 may automatically connect via Bluetooth.

In the embodiment shown, the Bluetooth driver 206 includes a Bluetooth single sign-on service 207. The Bluetooth single sign-on service 207 exchanges data between an authentication user interface 205 and the mobile smartcard 102 via Bluetooth interfaces 212, 106. Details regarding an exchange of messages between the authentication user interface 205, the mobile smartcard 102 and a remote authentication service 402 are described in below in conjunction with FIGS. 4-5.

The authentication keys 208 are stored at the desktop device 12 for example via the Bluetooth single sign-on service 207 or browser 204. Details regarding the use of the authentication keys 208 for effectuating the single sign-on processes of the present disclosure are also described below in conjunction with FIGS. 4-6.

Also in the example embodiment shown a server device 16 includes a remote secure application 302 and a network interface 304. The remote secure application 302 can be any of a variety of remote applications accessible via the browser 204. For example the remote secure application 302 can be a cloud-based or server-based application provided "as a service" such as an application hosted within Office365 or Salesforce server/cloud ecosystems.

As illustrated in FIG. 2, the desktop device 12 is communicatively connected to server device 16 and authentication device 22 via a network 18, such as the Internet. These devices are interconnected via network interfaces 210, 304, and 404. The devices may be remotely located from each other or two or more of the devices may be co-located.

In use, connection of the mobile device 14 to the desktop device 12 via the Bluetooth connection may allow access to the desktop secure application 202. The authentication service 402 can be accessed via the browser 204 to authenticate the user at the desktop device 12 for access to the remote secure application 302. Because the mobile smartcard 102 has previously been used to accesses the desktop secure application 202, the authentication service 402 and mobile smart card 102 may cooperate via the authentication user interface 205 and Bluetooth single sign-on service 207 to authenticate the user for use of the remote secure application 302 without requiring further user interaction.

Figure 3:
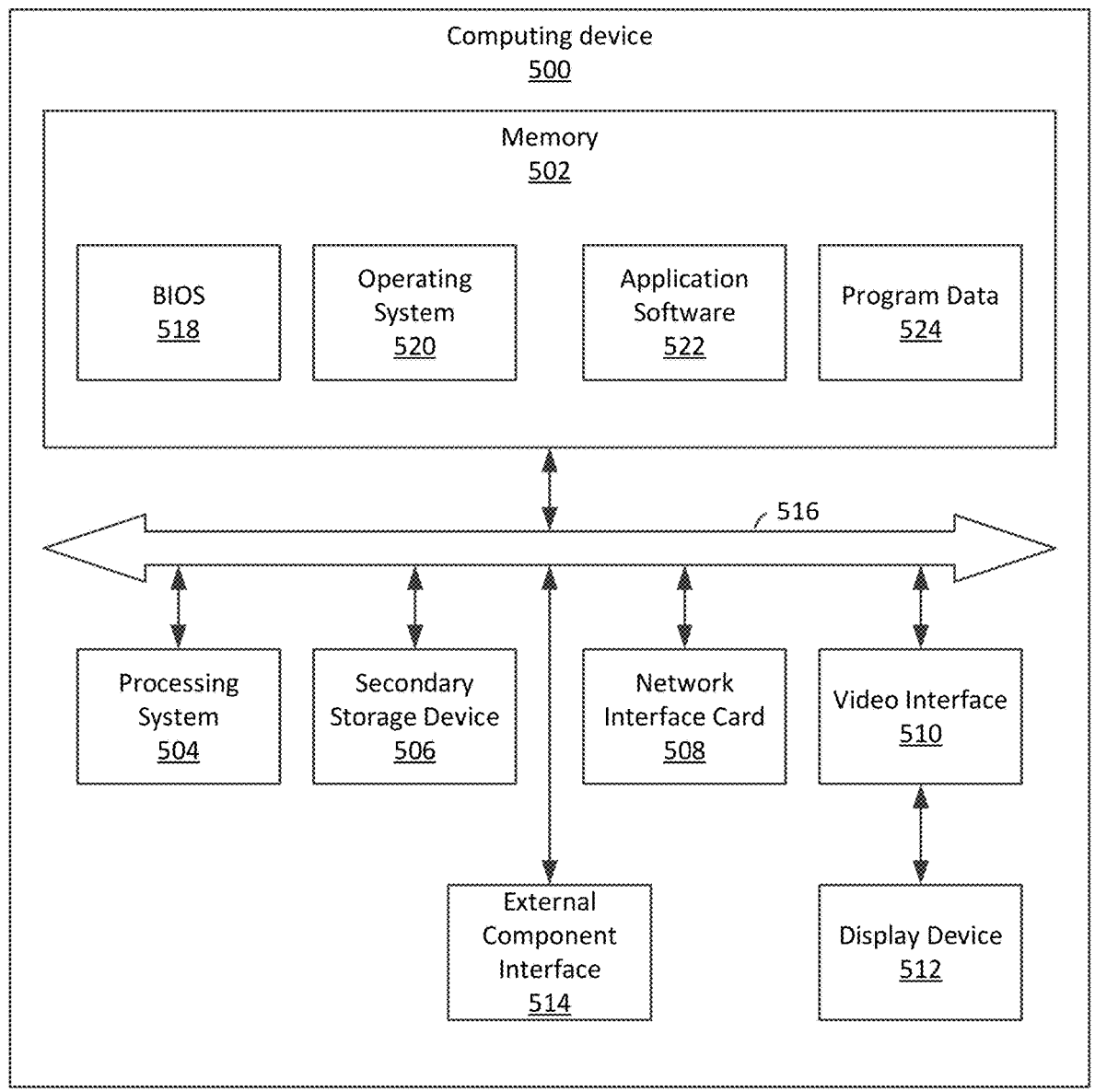
FIG. 3 illustrates an example computing device useable to implement aspects of the present disclosure.

Referring now to FIG. 3, a computing device 500 is shown, with which aspects of the present disclosure can be implemented. The computing device 500 can be used, for example, to implement any of the mobile device 14, desktop device 12, or cloud/server devices 16, 22 of FIGS. 1-2.

In the example of FIG. 3, the computing device 500 includes a memory 502, a processing system 504, a secondary storage device 506, a network interface card 508, a video interface 510, a display unit 512, an external component interface 514, and a communication medium 516. The memory 502 includes one or more computer storage media capable of storing data and/or instructions. In different embodiments, the memory 502 is implemented in different ways. For example, the memory 502 can be implemented using various types of computer storage media, and generally includes at least some tangible media. In some embodiments, the memory 502 is implemented using entirely non-transitory media.

The processing system 504 includes one or more processing units, or programmable circuits. A processing unit is a physical device or article of manufacture comprising one or more integrated circuits that selectively execute software instructions. In various embodiments, the processing system 504 is implemented in various ways. For example, the processing system 504 can be implemented as one or more physical or logical processing cores. In another example, the processing system 504 can include one or more separate microprocessors. In yet another example embodiment, the processing system 504 can include an application-specific integrated circuit (ASIC) that provides specific functionality. In yet another example, the processing system 504 provides specific functionality by using an ASIC and by executing computer-executable instructions.

The secondary storage device 506 includes one or more computer storage media. The secondary storage device 506 stores data and software instructions not directly accessible by the processing system 504. In other words, the processing system 504 performs an I/O operation to retrieve data and/or software instructions from the secondary storage device 506. In various embodiments, the secondary storage device 506 includes various types of computer storage media. For example, the secondary storage device 506 can include one or more magnetic disks, magnetic tape drives, optical discs, solid-state memory devices, and/or other types of tangible computer storage media.

The network interface card 508 enables the computing device 500 to send data to and receive data from a communication network. In different embodiments, the network interface card 508 is implemented in different ways. For example, the network interface card 508 can be implemented as an Ethernet interface, a token-ring network interface, a fiber optic network interface, a wireless network interface (e.g., WiFi, WiMax, etc.), or another type of network interface.

The video interface 510 enables the computing device 500 to output video information to the display unit 512. The display unit 512 can be various types of devices for displaying video information, such as an LCD display panel, a plasma screen display panel, a touch-sensitive display panel, an LED screen, a cathode-ray tube display, or a projector. The video interface 510 can communicate with the display unit 512 in various ways, such as via a Universal Serial Bus (USB) connector, a VGA connector, a digital visual interface (DVI) connector, an S-Video connector, a High-Definition Multimedia Interface (HDMI) interface, or a DisplayPort connector.

The external component interface 514 enables the computing device 500 to communicate with external devices. For example, the external component interface 514 can be a USB interface, a FireWire interface, a serial port interface, a parallel port interface, a PS/2 interface, and/or another type of interface that enables the computing device 500 to communicate with external devices. In various embodiments, the external component interface 514 enables the computing device 500 to communicate with various external components, such as external storage devices, input devices, speakers, modems, media player docks, other computing devices, scanners, digital cameras, and fingerprint readers.

The communication medium 516 facilitates communication among the hardware components of the computing device 500. The communications medium 516 facilitates communication among the memory 502, the processing system 504, the secondary storage device 506, the network interface card 508, the video interface 510, and the external component interface 514. The communications medium 516 can be implemented in various ways. For example, the communications medium 516 can include a PCI bus, a PCI Express bus, an accelerated graphics port (AGP) bus, a serial Advanced Technology Attachment (ATA) interconnect, a parallel ATA interconnect, a Fiber Channel interconnect, a USB bus, a Small Computing system Interface (SCSI) interface, or another type of communications medium.

The memory 502 stores various types of data and/or software instructions. The memory 502 stores a Basic Input/Output System (BIOS) 518 and an operating system 520. The BIOS 518 includes a set of computer-executable instructions that, when executed by the processing system 504, cause the computing device 500 to boot up. The operating system 520 includes a set of computer-executable instructions that, when executed by the processing system 504, cause the computing device 500 to provide an operating system that coordinates the activities and sharing of resources of the computing device 500. Furthermore, the memory 502 stores application software 522. The application software 522 includes computer-executable instructions, that when executed by the processing system 504, cause the computing device 500 to provide one or more applications. The memory 502 also stores program data 524. The program data 524 is data used by programs that execute on the computing device 500.

Although particular features are discussed herein as included within an electronic computing device 500, it is recognized that in certain embodiments not all such components or features may be included within a computing device executing according to the methods and systems of the present disclosure. Furthermore, different types of hardware and/or software systems could be incorporated into such an electronic computing device.

In accordance with the present disclosure, the term computer readable media as used herein may include computer storage media and communication media. As used in this document, a computer storage medium is a device or article of manufacture that stores data and/or computer-executable instructions. Computer storage media may include volatile and nonvolatile, removable and non-removable devices or articles of manufacture implemented in any method or technology for storage of information, such as computer readable instructions, data structures, program modules, or other data. By way of example, and not limitation, computer storage media may include dynamic random access memory (DRAM), double data rate synchronous dynamic random access memory (DDR SDRAM), reduced latency DRAM, DDR2 SDRAM, DDR3 SDRAM, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

It is noted that, in some embodiments of the computing device 500 of FIG. 3, the computer-readable instructions are stored on devices that include non-transitory media. In particular embodiments, the computer-readable instructions are stored on entirely non-transitory media.

Figure 4:
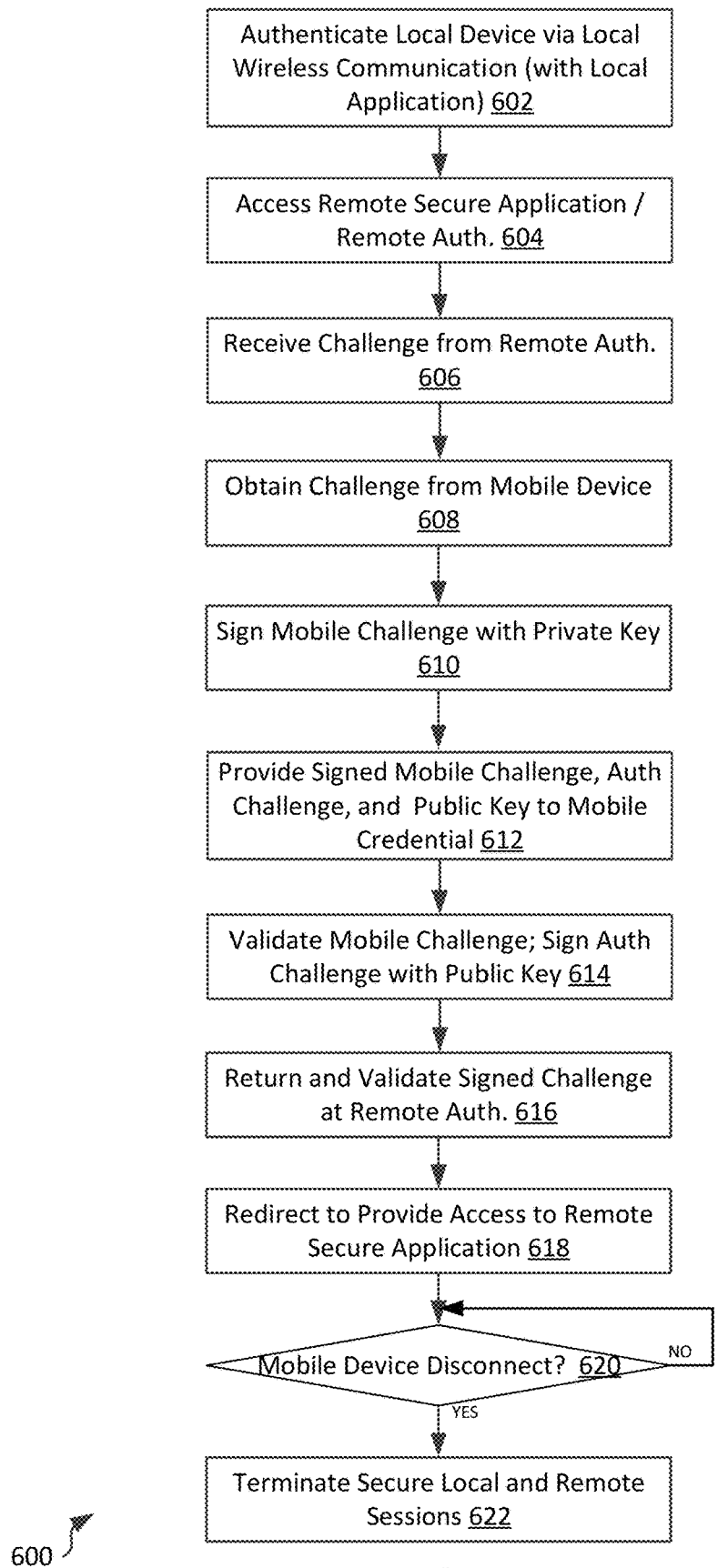
FIG. 4 illustrates a method of facilitating sign-on to a second secure application based on sign-on to a first secure application, in an example embodiment.

Referring now to FIG. 4, a method 600 of facilitating sign-on to a second secure application based on sign-on to a first secure application is shown, in an example embodiment. The example method 600 can be performed, for example, using the systems and networks described above in connection with FIGS. 1-3.

In the example embodiment shown, the method includes, at 602, authenticating a user with a first secure application. This authentication may be authentication of a local application, such as a local operating system or application-level program. The authentication can be performed in response to a user attempting to access the first secure application, or in response to connection of a mobile device to the computing system on which the first secure application resides, such as a local computing device.

In the embodiment shown, the method includes, at 604, accessing a remote secure application or remote authentication service. Accessing the remote authentication service may include, for example, receiving at a browser of a local computing device a redirection from a remote secure application to the remote authentication service for purposes of authentication and access to the remote secure application.

In the embodiment shown, the method includes, at 606, receiving a challenge from the remote authentication service. This may be performed, for example, in response to transmitting a request for the challenge from a local computing device to the remote authentication service.

In the embodiment shown, the method includes, at 608, obtaining a challenge from the mobile device as well. This may be performed, for example, by issuing a request from a browser or authentication user interface to a Bluetooth single sign-on service, which in turn relays that request to the mobile device credential. The mobile device can either return a stored challenge, or create a challenge and store that challenge, returning it to the browser via the Bluetooth single sign-on service.

In the embodiment shown, the method includes, at 610, signing the received mobile challenge with a private key. The private key maybe, for example, a private key of a public/private key pair that is previously stored at the local computing device or generated at the local computing device in response to receiving the challenge. The public/private key pair may be generated by either the authentication user interface 205 or Bluetooth single sign-on service 207. The public private key pair may be included within authentication keys 208 as seen in FIG. 2.

In the embodiment shown, the method includes, at 612, providing the signed mobile challenge, the challenge received from the authentication service, and the public key of the public-private key pair to the mobile device. In particular, the signed challenge and the public key can be provided to the mobile credential (e.g., mobile smart card 102).

In the embodiment shown, the method includes, at 614, validating the signed challenge at the mobile device, and in particular at the mobile smart card 102. Validating the challenge can include use of the public key that is generated as part of the public/private key pair at the authentication user interface and/or browser. It can also include, for example, requesting user authentication credentials at the mobile device 14 to register the received public key, and subsequently registering the public key at the mobile smart card 102.

The method also includes, in the embodiment shown, (and also at 614), signing the authentication service challenge with user credentials that are either are stored in the mobile smart card 102 or received from a user (for example, user authentication credentials as requested above).

In the embodiment shown, the method includes, at 616, returning the signed authentication service challenge to the first computing device and validating the challenge signed using the user credentials by sending the user-signed version of the authentication service challenge to the remote authentication service 402.

In the embodiment shown, the method includes, at 618, receiving a redirection from the remote authentication service that redirects a browser of the first computing device to the remote secure application. The redirection from the remote authentication service indicates to the browser that the user is authenticated to access the remote secure application. Accordingly, the user may, via the browser, transmit requests to the remote secure application.

As further seen in FIG. 4, at 620, the connection to both the local secure application(s) and remote secure application(s) will be maintained so long as the connection between mobile device 14 and local computing device 12 is maintained. That is, in some embodiments, the Bluetooth single sign-on service 207 will monitor connection status of a Bluetooth connection to the mobile device 14. If and when the connection no longer exists (e.g., a user turns off Bluetooth, removes the mobile device from the vicinity of the local computing system, etc.) a secure connection termination process is automatically initiated to close both local and remote secure application connection sessions in a seamless manner without causing data loss. One example messaging sequence useable to accomplish this is illustrated in further detail below in connection with FIG. 6.

Referring to FIG. 4 overall, it is noted that after the user is authenticated at both the mobile device and the first secure application, authenticating the user at the remote secure application may require a browser to be redirected to an authentication service, but does not require the user to reenter his or her user credentials. Accordingly, the user experience is simplified.

Figure 5:
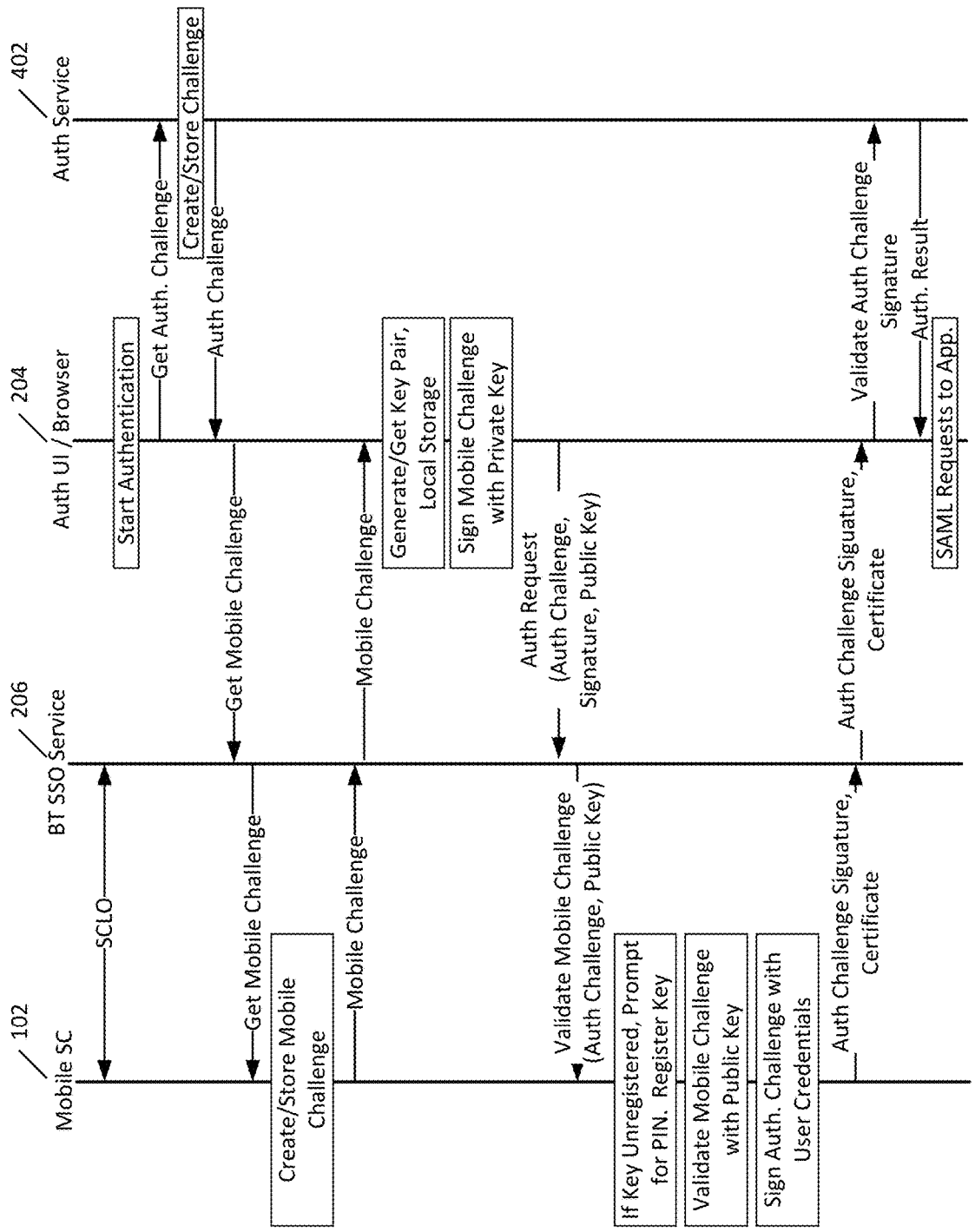
FIG. 5 illustrates a messaging sequence in which single sign-on can be accomplished upon an initial sign-on sequence being performed.

FIG. 5 illustrates a messaging sequence 700 in which single sign-on can be accomplished upon an initial sign-on sequence being performed. The messaging sequence 700 generally reflects a communication sequence occurring after the user has been authenticated for use of local secure application at a first computing device 12 of FIGS. 1-2. Generally, the messaging sequence 700 is performed on a mobile smartcard 102, a Bluetooth single sign-on service 207, a browser 204, and a remote authentication service 402.

In the example shown, a secure channel is established between the mobile smartcard 102 and Bluetooth single sign-on service 207. A user, seeking to access a remote secure application, will initiate an authentication process within a browser 204. When the user accesses the remote secure application, the user may be redirected to an authentication service 402. To initiate authentication via the remote authentication service 402, the authentication user interface 205 presented within browser 204 transmits a request for a challenge to the remote authentication service 402. In the example shown, the remote authentication service 402 will create and store a challenge, and return the challenge to the browser 204.

The authentication user interface 205 within browser 204 also transmits a request to the mobile device 14 (e.g., to mobile smart card 102) to obtain a challenge from the mobile device. The request can be passed through the Bluetooth single sign-on service 207. In the example shown, the mobile device, and in particular the mobile smart card 102, will create and store a mobile challenge, which is returned to the browser 204 via the Bluetooth single sign-on service 207. It is noted that the order in which challenges are requested from the authentication service 402 and mobile smart card 102 may be reversed or altered in alternative embodiments.

Upon acquisition of the remote authentication service challenge and the mobile challenge, if the authentication user interface 205 is able to obtain a key pair from local storage, it will do so. If no key pair exists, the authentication user interface 205 and/or browser 204 may generate and store a new public-private key pair. The received mobile challenge will then be signed by the authentication user interface with the private key of the key pair. An authentication request including the signed mobile challenge, the remote authentication service challenge, and the public key of the public-private key pair are provided to the Bluetooth single sign-on service 207. The Bluetooth single sign-on service 207 will relay the request to the mobile smart card 102 to validate the signed mobile challenge. Alongside the request, the Bluetooth single sign on service 207 will also provide the public key and the remote authentication service challenge.

At the mobile smart card 102, an assessment is made to determine whether the public key is registered with the mobile smartcard. If the public key is not registered, the user may be prompted to enter user authentication information, for example a PIN code, into a user interface of the mobile device. Once the user successfully enters a PIN code the public key is registered within the mobile smart card 102. The mobile smartcard 102 then validates the challenge signature on the mobile challenge using the public key received and registered. The mobile smart card 102 will then sign the remote authentication service challenge with the user credentials stored in the mobile smart card 102. The mobile smart card 102 will then return to the authentication user interface 205 the signed remote authentication service challenge and a certificate. In particular, the signed challenge and the certificate are provided to the Bluetooth single sign-on service 207.

In the embodiment shown, the Bluetooth single sign-on service 207 will then relay the user-signed remote authentication service challenge and the certificate to the browser 204, for use by the authentication user interface 205. The authentication user interface 205 will then relay the user-signed remote authentication service challenge to the authentication service 402, where it can be authenticated. An authentication result is then sent from the authentication service 402 back to the browser 204. This may take the form of a redirection back to the remote secure application, thereby allowing for subsequent requests to be passed directly to the now-authenticated remote secure application. In example embodiments, the authentication result can take the form of an authentication token received at the browser 204 for use in accessing a remote secure application, e.g., via SAML or OIDC-based requests.

Referring to FIGS. 1-5 generally, it is noted that only in the case that the public key of the browser is not registered will a user typically be required to provide further user authentication information (e.g., a PIN code) into the mobile device. Once a public key has been registered at the mobile smart card 102, the browser 204 and the local computing device 12 generally have established a registered relationship with the mobile smart card 102, and therefore no re-entry would typically be required. Accordingly, the entire sequence of operations as illustrated in FIG. 5 may be obscured to the user, and will appear as a single sign-on service that allows access to a remote secure application based on previous authentication of the user at a local secure application. In this way, the user may have his or her secure access to desktop applications via the mobile smart card seamlessly extended to remote applications, including cloud applications, which the user may wish to access, without a need to provide further user input to effectuate authentication for each new secure application where user re-entry of authentication information would otherwise be required. Still further, because mutual challenges are requested from the mobile device and the remote authentication service from a local computing device, end-to-end security from the mobile device to the local computing device to the remote authentication service can be ensured.

Figure 6:
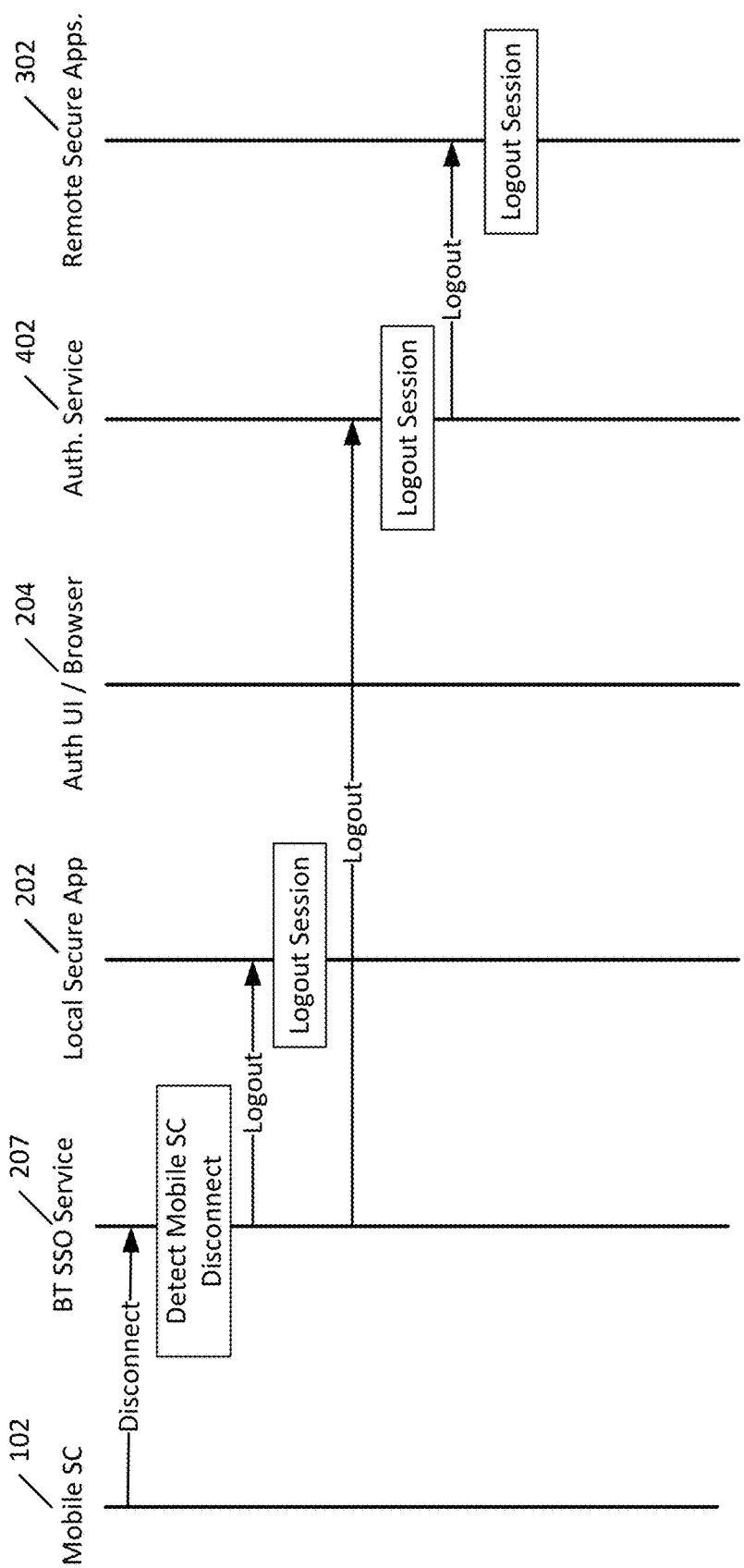
FIG. 6 illustrates a messaging sequence in which a single sign-on session can be terminated based on disconnection of a mobile device from a local computing device.

Referring now to FIG. 6, a messaging sequence 800 in which single sign-on session can be terminated in response to disconnection of a mobile device from a local computing device (e.g., disconnection of a Bluetooth connection) is shown. The messaging sequence 800 generally reflects a communication sequence occurring after a single sign-on sequence has been performed, such as the one in FIG. 5. Generally, the messaging sequence 800 is performed on a mobile smart card 102, a Bluetooth single sign-on service 207, a local secure application 202, a browser 204, a remote authentication service 402, and a remote secure application 302.

In the example shown, a mobile smart card 102 may disconnect from a local computer 14, e.g., by having its Bluetooth connection disconnected. In this instance, a Bluetooth single sign-on service 207 can detect the disconnection of the mobile smart card 102, and will transmit a logout command to the local secure application 202 as well as a logout command, via the browser 204, to the remote authentication service 402. The remote authentication service will cause the user's session to log out, thereby terminating the user's valid credentials for access to remote secure applications; additionally, the remote authentication service 402 can transmit a logout command to the remote secure application(s) 302 that utilize the remote authentication service 402. This causes the remote secure applications to log out (e.g., saving work before sessions/connections are terminated).

Accordingly, based on the sequence 800 seen in FIG. 6, upon disconnection of the mobile device from a local computing system, not only will a local secure application be caused to log out, but a remote secure application will be caused to log out seamlessly as well. Accordingly, not only is the sign-on process performed in a manner that is obscured to the user, the log-out process is also performed without a requirement of additional user action.

Although the present disclosure has been described with reference to particular means, materials and embodiments, from the foregoing description, one skilled in the art can easily ascertain the essential characteristics of the present disclosure and various changes and modifications may be made to adapt the various uses and characteristics without departing from the spirit and scope of the present invention as set forth in the following claims.

The invention claimed is:

1. A method comprising:
   authenticating, at a first computing system, a user with a first secure application based on information received from a mobile device via a local wireless connection between the mobile device and the first computing system;
   obtaining, via a browser of the first computing system, a remote challenge from a remote authentication service;
   obtaining, via a browser of the first computing system, a mobile challenge from the mobile device;
   signing the mobile challenge with a private key of a public-private key pair at the first computing system;
   transmitting to the mobile device a version of the mobile challenge signed at the first computing system, the remote challenge, and a public key of the public-private key pair;
   receiving, from the mobile device, a signed version of the remote challenge and a certificate indicating validation of the mobile challenge at the mobile device using the public key, the signed version of the remote challenge being signed by the mobile device;
   transmitting the signed version of the remote challenge to the remote authentication service; and based on receiving an authentication result from the remote authentication service, granting access at the first computing system to a remote secure application via the browser.

2. The method of claim 1, wherein the information received from the mobile device comprises a PKI credential.

3. The method of claim 1, further comprising retrieving the public-private key pair from storage at the first computing system.

4. The method of claim 1, further comprising generating the public-private key pair at the first computing device.

5. The method of claim 1, wherein granting access at the first computing system to the remote secure application occurs without requiring user re-entry of authentication credentials at either the mobile device or the first computing system.

6. The method of claim 1, further comprising:
accessing a remote host associated with the remote secure application; and
receiving a redirection link from the remote host redirecting the browser to the remote authentication service, wherein the remote authentication service is separate from the remote host.

7. The method of claim 1, wherein the first secure application comprises a local authentication application useable to provide access to an operating system of the first computing system.

8. The method of claim 1, wherein an authentication service hosted within a webpage within the browser is configured to sign the challenge with the private key.

9. The method of claim 1, wherein a Bluetooth single sign-on service embedded within a Bluetooth driver on the first computing system exchanges data between the browser and the mobile device.

10. The method of claim 9, wherein transmitting the user-signed version of the challenge is performed via the Bluetooth single sign-on service.

11. The method of claim 1, further comprising:
detecting disconnection of the local wireless connection between the mobile device and the first computing system;
in response to detecting disconnection, terminating an authenticated session with the first secure application and transmitting a notification to the remote authentication service to terminate a remote session that provides access to the remote secure application at the first computing system.

12. The method of claim 1, wherein the local wireless connection comprises a Bluetooth connection.

13. The method of claim 1, wherein the user-signed version of the challenge is signed with user credentials of the user.

14. A method of authenticating a user for use of a plurality of secure applications, the method comprising:
establishing a local wireless connection between a mobile device and a first computing system;
in response to receipt of a request from the first computing system, transmitting a mobile device challenge to the first computing system;
receiving a signed version of the mobile device challenge, a remote authentication challenge, and a public key of a public-private key pair from the first computing system, the signed version of the mobile device challenge being signed with a private key of the public-private key pair, the remote authentication challenge being a challenge received at the first computing system from a remote system;
validating the signed version of the mobile device challenge using the public key;
signing the remote authentication challenge with the user credentials stored at the mobile device; and
transmitting a signed version of the remote authentication challenge and a certificate to the first computing system.

15. The method of claim 14, further comprising:
determining whether the public key is registered at the mobile device; and
upon determining that the public key is not registered at the mobile device, prompting the user for authentication information prior to registering the public key.

16. The method of claim 15, wherein the authentication information comprises a PIN code.

17. A system for facilitating authentication of a user with a plurality of secure applications, the system comprising:
a computing system comprising:
a local wireless communication interface;
a network interface;
a programmable circuit operatively connected to the local wireless communication interface and the network interface;
a memory operatively connected to the programmable circuit and storing instructions comprising a first secure application, a browser and a local wireless communication driver, the instructions further configured to, when executed by the programmable circuit:
authenticate, at a first computing system, a user with a first secure application based on information received from a mobile device via a local wireless connection between the mobile device and the first computing system;
obtain a remote challenge from a remote authentication service;
obtain, via the browser, a mobile challenge from the mobile device;
sign the mobile challenge with a private key of a public-private key pair;
transmit to the mobile device a signed version of the mobile challenge, the remote challenge, and a public key of the public-private key pair;
receive, from the mobile device, a signed version of the remote challenge and a certificate indicating validation of the mobile challenge at the mobile device using the public key, the signed version of the remote challenge being signed by the mobile device;
transmit the signed version of the remote challenge to the remote authentication service; and
based on receiving an authentication result from the remote authentication service, grant access to a remote secure application via the browser.

18. The system of claim 17, wherein the local wireless communication interface comprises a Bluetooth interface, and the local wireless communication driver comprises a Bluetooth driver.

19. The system of claim 18, further comprising a mobile device communicatively connected to the computing system via the Bluetooth interface.

20. The system of claim 17, wherein the user-signed version of the challenge is signed with a user credential previously stored at the mobile device in association with authentication of the user with the first secure application.

21. The system of claim 17, further comprising a remote authentication service, wherein, receiving an authentication result includes receiving a redirection from the remote authentication service to the second secure application, the second secure application being remote from the computing system.

\* \* \* \* \*